United States Patent
Ikeda et al.

[11] Patent Number: 5,879,836
[45] Date of Patent: Mar. 9, 1999

[54] LITHIUM BATTERY WITH ELECTRODES CONTAINING CARBON FIBRILS

[75] Inventors: Hiroharu Ikeda, Machida, Japan; Robert Hoch, Hensonville, N.Y.; Robert Hausslein, Lexington, Mass.

[73] Assignee: Hyperion Catalysis International Inc., Cambridge, Mass.

[21] Appl. No.: 612,930

[22] PCT Filed: Sep. 9, 1994

[86] PCT No.: PCT/US94/10181

§ 371 Date: Aug. 29, 1996

§ 102(e) Date: Aug. 29, 1996

[87] PCT Pub. No.: WO95/07551

PCT Pub. Date: Mar. 16, 1995

[30] Foreign Application Priority Data

Sep. 10, 1993 [JP] Japan ................................. 5-226040

[51] Int. Cl.[6] .................................................. H01M 4/60
[52] U.S. Cl. ............................................................ 429/231.8
[58] Field of Search ................................ 429/218, 212, 429/232

[56] References Cited

U.S. PATENT DOCUMENTS

| | | |
|---|---|---|
| 4,508,608 | 4/1985 | Palmer ..................................... 429/218 |
| 4,510,216 | 4/1985 | Nogami et al. ......................... 429/101 |
| 4,663,230 | 5/1987 | Tennent . |
| 4,707,423 | 11/1987 | Kalnin et al. ........................... 429/112 |
| 4,925,752 | 5/1990 | Fauteux et al. ......................... 429/218 |
| 4,980,250 | 12/1990 | Takahashi et al. ...................... 429/194 |
| 5,028,500 | 7/1991 | Fong et al. ............................. 429/194 |
| 5,187,035 | 2/1993 | Miyabayashi et al. ................. 429/218 |
| 5,225,296 | 7/1993 | Ohsawa et al. . |
| 5,246,794 | 9/1993 | Blomgren et al. . |
| 5,273,842 | 12/1993 | Yamahira et al. ....................... 429/94 |
| 5,302,474 | 4/1994 | Shackle . |
| 5,482,797 | 1/1996 | Yamada et al. ........................ 429/218 |

OTHER PUBLICATIONS

Robert Grant et al., "Grant and Hackh's Chemical Dictionary", 5th Edition, McGraw–Hill Book Company, p. 234 (no monthavailable), 1987.

*Patent Abstracts of Japan*, vol. 14, No. 211 (C–715), p. 77, for Kokai No. 2–47347 (Morimoto) dated Feb. 16, 1990.

*Primary Examiner*—Maria Nuzzolillo
*Assistant Examiner*—Carol Chaney
*Attorney, Agent, or Firm*—Barry Evans, Esq.; John E. Boyd, Esq.; Whitman Breed Abbott & Morgan LLP

[57] ABSTRACT

A lithium battery characterized in that the anode (1) is formed from a carbon fibril material comprised of an aggregate of fibrils or non-aggregated mass of fibrils having an average particle diameter of 0.1 to 100 microns in which fine, filiform carbon fibrils of 3.5 to 75 nm an in diameter are intertwinned with each other, and fibrils being intercalated with lithium. The cathode (3) also contains carbon fibrils.

4 Claims, 1 Drawing Sheet

LITHIUM BATTERY WITH ELECTRODES CONTAINING CARBON FIBRILS

FIELD OF THE INVENTION

This invention relates to a lithium battery in which carbon fibrils are used as an anode and/or cathode in a lithium secondary battery.

BACKGROUND OF THE INVENTION

A great deal of research has been conducted on lithium secondary batteries in which metallic lithium is used as the negative electrode because high voltage and high energy density are anticipated. A family of batteries, called variously lithium ion or rocking chair or swing systems, has been developed which include a carbon anode into which lithium intercalates. The ability to intercalate lithium is critical. Classically this requires a relatively good graphite structure. The intercalate is a true compound corresponding to a composition of $C_6Li$. It thus has safety and other advantages over a metallic lithium anode. However, the problem with batteries in which metallic lithium is used for the negative electrode is that cycle life is decreased because of reactions between the lithium and the solvent during charging and because of dendrite growth.

In order to eliminate this problem, studies have been conducted of Li-Al alloy and of various types of carbon fiber materials as negative electrode materials. However, new problems such as decrease in mechanical strength and deterioration of self-discharging characteristics have arisen with these materials.

As to the "rocking chair" cell, lithium is the only ionic species moving back and forth between the electrodes during charging and discharging. Specifically, during charging, intercalated lithium ions from the cathode e.g., $LiMn_2O_4$, move through the electrolyte to the anode where they pick up an electron in the process of intercalating the carbon. During discharge the reverse reaction takes place, i.e., the uncharged lithium in the carbon loses an electron to the external circuit as it ionizes to Li+ which migrates to and enters the cathode concurrent with local reduction of the oxide lattice by an electron from the external circuit. The half cell reaction are shown below doing discharge.

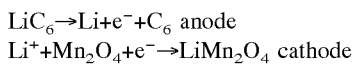

$LiC_6 \rightarrow Li + e^- + C_6$ anode $Li^+ + Mn_2O_4 + e^- \rightarrow LiMn_2O_4$ cathode The prior art lithium ion system is characterized by an intercalatable carbon anode and an intercalatable variable valence metal oxide cathode usually also admixed with carbon for conductivity. It is the use of the carbon anode that sets the rocking chair system apart from earlier configurations using lithium metal anodes. These latter suffered from safety problems related to dendrite formation, flaking and spalling of lithium metal, leading, in turn to dangerously high reaction rates and to side reactions with the electrolyte. These safety problems have been largely sidestepped by the absence of a bulk lithium phase.

Development of new more oxidation resistant electrolytes and, longer range, the development of polymer electrolytes also contributes to safer Li cells. Nevertheless, these batteries utilize very reactive electrode materials and systems. Studies of even the Li intercalation electrode suggest it must be properly engineered to avoid runaway reaction under damage or short circuit conditions.

Although both electrodes of the lithium ion cell use carbon, these carbons, like most electrode materials, were selected from those commercially available. That neither anode nor cathode performance was satisfactory is seen from the poor power density and from the poor approach to theoretical energy density. The lithium ion battery as presently available has commercial utility only because of its inherent thermodynamics and rather in spite of less than optimal kinetics and engineering.

A target use for fibrils is electrodes and current collectors. Fibrils are ca. 100 Å diameter, catalytically grown, graphitic fibers, typically several microns long. While fibrils are graphitic, geometric constraints force some differences with pure graphite. Like graphite, fibrils are composed of parallel layers of carbon but in the form of a series of concentric tubes disposed about the longitudinal axis of the fibers rather than as multi-layers of flat graphite sheets. Thus, because of the geometric constraints in the narrow diameter of the fibrils, the graphite layers cannot line up precisely with respect to the layers below as flat graphite sheets can. Convergent beam electron diffraction has confirmed that the (002) graphitic planes are oriented along the tube adds with high crystallinity.

The structure of fibrils compares quite closely with the much studied buckytubes. However, unlike buckytubes, fibrils are produced as indispersable aggregates uncontaminated with amorphous carbon allowing fibrils to be fashioned into electrode structures with only minimal processing. The fibrils are grown by contacting catalyst particles with gaseous hydrocarbon in a hydrogen rich atmosphere. Their diameters are determined by the size of the catalyst particles and average 7–12 nanometers. Lengths are several micrometers. They are hollow tubes with wall thicknesses 2 to 5 nanometers. The walls are essentially concentric tubes of individual graphite layers rolled into cylinders. At intervals along the length of a fiber some of the inner layers may curve into hemispherical cepta spanning the hollow interior. Near these, the walls may for a short distance change into nested cones. These reflect changes in the catalyst/carbon interface during growth of the fibril. Unlike other catalytic vapor grown carbon fibers they are free of less organized pyrolytic carbon on their surfaces.

Buckytubes, however, are grown by condensation of carbon vapor in an arc. They usually have a wider distribution of diameters from single layer walls to many tens of layers. The arrangement of graphite layers in the walls is very similar to fibrils. Some have only concentric cylinders (or polygonal cross sections). Others also have septa and nested cones. It is likely that some buckytubes are grown catalytically on catalyst particles derived from impurities in the source carbon or from the apparatus. It is not yet certain beyond doubt that any are self assembled without catalyst—spark temperatures are sufficient to vaporize iron or other particles after growth. Less organized carbon is deposited at the same time in the form of polygons or turbostratic carbon some of which may coat the buckytubes.

As would be expected from their structure and similarity to graphite, fibrils are conductive. While the conductivity of individual fibrils is difficult to measure, a recent attempt has yielded an estimated resistivity value of 9.5 (±4.5) mΩcm, a resistivity slightly higher than typically measured for graphitized carbon, but consistent with what has recently been recently measured for buckytubes.

Fibrils can be assembled into macrostructures composed of interconnected fibril nanotubes, similar to felt mats. The large number of contacts between individual, conductive fibrils in the fibril mat results in mats with high conductivities as well.

The porosity of homogeneous fibril mats is determined by overall mat density. Porosity can be further modified by co-slurrying fibrils with macrofibers (e.g., glass or carbon)

before formation of the mat. This technique for forming both homogenous and co-slurried fibril mats is both convenient on the laboratory scale and is readily amenable to scale-up using fiber wet-laying (e.g., paper making).

Because of their small diameter, fibrils have a surface area of ca. 200 m$^2$/g as determined by BET measurement. The value for the surface area can also be arrived at by calculation based on average fibril dimensions. This agreement between calculation and the BET measurement demonstrates that the 200 m$^2$/g. is all on the external surface of the fibrils. Analytical electrochemistry of fibril mat electrodes demonstrate that all of the fibril surface area is available for electrochemical processes. For example, the double layer charging capacitance of fibril mat electrodes varies linearly with the mass of fibrils in the electrode over a wide range of fibril mat densities. Fibrils allow for a combination of constant pore size and high surface area that is not available in other conductive carbons.

Such open nets of fibrils impose their high external surface area and consequent electrochemical availability on any chemical system that can be deposited on or physically entangled within mats of them.

Currently available lithium ion batteries use an intercalatable carbon as the anode. The maximum energy density of such batteries corresponds to the intercalation compound $C_6Li$, with a specific capacity of 372 A-hours/kg.

The ability to intercalate lithium is critical. Classically, this requires a relatively good graphite structure. This intercalate is a true compound corresponding to a composition of $C_6Li$.

OBJECTS OF THE INVENTION

The objective of this invention is to solve the aforementioned problems of the conventional technology and to provide a lithium battery whereby decrease in cycle life due to reactions between the negative electrode and the solvent and due to formation of dendrites is inhibited and with which there are superior self-discharging characteristics.

Another object is to provide a lithium battery using Geus fibrils and lithium intercalates.

Another object is to explore improvements in performance of lithium ion batteries through use of fibril nanotubes as the current collector for both electrodes.

Yet another object is to achieve high power density in lithium rechargeable cells possible by exploiting the high accessible surface area of fibrils (200 M$^2$/g), formed into a three dimensional conductive networks. Lithium will be deposited in the inter-calatable electrode structures i.e. carbon at the anode, $LiMn_2O_4$ or some other redox system at the cathode—in such a way that no portion of the intercalatable structures will be more than a few hundred Angstroms from both the electrolyte interface and the fibril network itself which serves as current collector and structural support.

These and other objects, features and advantages of the invention will become readily apparent from the ensuing description, and the novel features will be particularly pointed out in the appended claims.

SUMMARY OF THE PRESENT INVENTION

The invention is directed to a lithium battery characterized in that one or both electrodes are formed using a carbon fibril material comprised of an aggregate of fibrils having an average particle diameter of 0.1 to 100 µm in which fine, filiform carbon fibrils of 3.5 to 75 nm in diameter are intertwined with each other.

It is also now believed that non-aggregated fibrils such as are disclosed in U.S. patent application Ser. No. 08/057,328, filed May 5, 1993, the disclosure of which is hereby incorporated by reference may be used in the electrodes of the invention.

In a preferred embodiment the anode is a carbon fibril aggregate or non-aggregated fibril mass intercalated with lithium.

BRIEF DESCRIPTION OF THE DRAWINGS

The invention will be understood more clearly and fully from the following detailed description, when read with reference to the accompanying figures, in which As shown in FIG. 1, 1 is designated as a negative electrode sheet; 2 is a separator; and 3 is a positive electrode sheet.

DETAILED DESCRIPTION OF THE INVENTION

Figure 1:
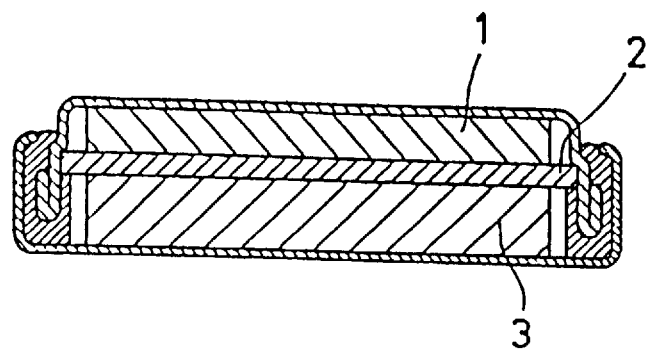
FIG. 1 is a cross-sectional view of one example of a battery in this invention.

The invention is broadly directed to a lithium battery characterized in that one or both electrodes are formed using a carbon fibril material.

The electrodes are formed using a carbon fibril material comprised of an aggregate or non-aggregated mass of fibrils having an average particle diameter of 0.1 to 100 µm in which fine, filiform carbon fibrils of 3.5 to 75 nm in diameter are present.

The spinel $LiMn_2O_4$ appears to be the best of the variable valence metal cathode systems known. In order to exploit the advantages of fibrils one then deposits lithiated manganese dioxide on or within them.

The conventional synthesis of $LiMn_2O_4$ involves oxidation chemistry incompatible with fibrils. Low temperature syntheses are conducted.

When precipitation is carried out in the presence of a slurry of fibrils and the product filtered, the product should be a fibril mat containing "islands" of $LiMn_2O_4$, necessarily very small because of the small spaces within the mat Hyperion has carried out a program aimed at deposition of $MnO_2$ in fibril electrodes using a similar approach and yielding fibril mats with very small $MnO_2$ crystallites disposed within them. TEM shows that such a mat has $MnO_2$ inclusions of about 100 Å size. The desired $LiMn_2O_4$ looks similar.

It has been shown that batteries comprising lithium intercalates in the anode is possible. Successful lithium batteries made up of Geus (fishbone) fibrils and lithium intercalates as anodes are also within the scope of the invention.

Kinetics and energetics of lithium storage are studied on carbonized electrode materials. Fibril/carbon electrodes are evaluated by both potentiostatic and galvanostatic methodologies to determine the energetics and kinetics of lithium incorporation and release in standard three-electrode reference cells using $LiClO_4$/PC/DEM and a lithium metal counter/reference. Fibril/carbon electrodes are evaluated over a wide range of charge and discharge rates. Electrode candidates that show highest capacities or charge/discharge rates are further evaluated for cycle life. Lithiated manganese dioxide are prepared using precipitation methodologies.

The benefits of the invention are those that flow from major improvements in rechargeable portable energy storage. Near term, the target is portable electronics, in which market available lithium ion batteries are beginning to compete with more established nickel cadmium and nickel metal hydride batteries. Longer term, the target is the electric vehicle. Clearly, lithium batteries show advantages over traditional lead-acid systems. Rocking chair batteries already have far higher energy density, one of the critical performance parameters for EV.

Fibrils have been shown to offer both high surface area and controlled porosity to help reduce diffusional resistances. This characteristic may produce better density at constant energy density.

One also expects to see improvements in battery life from fibril based electrodes. For example, because the spinel is not relied upon as the mechanical basis of this electrode, processes leading to disintegration of $LiMn_2O_4$ should become unimportant. Pieces as small as 100 Å are easily retained within the electrode and should continue to contribute to the electrochemistry.

Another basis for improvements in life using fibrils as the carbon component of the anode stems from their lack of residual oxygen on edge carbons, fibrils are produced in a highly reducing atmosphere. Their handling can be managed to keep the level of chemically bound oxygen as low as necessary. Such bound oxygen has been implicated as catalysts of damaging electrolyte reactions.

Another unquantifiable benefit would derive from replacement of non-rechargeable primary cells in consumer use with rechargeable lithium ion cells. Although rechargeable and AA, C and D cells have been available for some time, they have not found consumer acceptance. A lithium ion cell, if it had sufficiently high energy density, i.e., were significantly lighter than a conventional alkaline $MnO_2$ cell, could be the key to consumer acceptance.

The diameter of the carbon fibrils that are used in this invention should be 3.5 to 75 nm, and, preferably, 5 to 30 nm and their length should be at least greater than 5 times their diameter, and preferably, $10^2$ to $10^4$ times their diameter.

When the diameter of the carbon fibrils exceeds 75 nm, their effect in providing conductivity is decreased. When it is less than 3.5 nm, the carbon fibrils may scatter and become difficult to handle. When the length of the carbon fibrils is less than 5 times their diameter, conductivity is reduced.

An aggregate is formed in which the carbon fibrils are fine and filiform and in which they are intertwined with each other. The average particle diameter of the aggregate should be 0.1 to 100 μm, preferably, 0.2 to 50 μm, and, more preferably, 0.2 to 30 μm. When the average particle diameter exceeds 100 μm, a mixture with binder powder tends to be insufficient when the aggregate is used as the negative electrode of a lithium battery. When the average particle diameter is less than 0.1 μm, infiltration of the electrolytic solution does not readily occur and the lithium ion intercalation reaction does not readily occur when the aggregate is used as the negative electrode of a lithium battery.

The 90% diameter ($d_{90}$), which is the index of distribution of the aggregate, should be less than 100 m, preferably, less than 80 m, and, more preferably, less than 50 m. Further, the 90% diameter is less than 7.5 times the average particle diameter.

The average particle diameter (dm) and the 90% diameter ($d_{90}$) in this invention are defined so as to satisfy the relationships indicated in the following formulas. Here, dmin is taken as the minimum particle diameter and dmax is taken as the maximum particle diameter in the particle size distribution in which the volumetric ratio Vd of the particle diameters d is taken as the probability variable.

Formula 1:

$$0.5 = \sum_{d\min}^{dm} Vd \text{ or } 0.5 = \sum_{dm}^{d\max} Vd$$

Formula 2:

$$0.9 = \sum_{d\min}^{d90} Vd$$

The aspect ratio of the carbon fibrils that form the carbon fibril aggregate should ordinarily be greater than 5, preferably, greater than 100, and, more preferably, greater than 1000. In addition, the fibrils are ordinarily tubular with a hollow core.

Moreover, these carbon fibrils should not have a continuous thermal carbon layer and should have several graphite layers parallel to the fibril axis. The proportion of the surface area that is coated with the aforementioned thermal carbon coating should ordinarily be less than 50%, preferably, less than 25%, and, more preferably, less than 5%.

The carbon fibrils that are used in this invention can be obtained, for example, using carbon fibrils manufactured by the method described in Japanese Patent Application No. 2-503334 [1990] as the raw material. This material may be use in unaltered form or be subjected to chemical or physical treatment, after which it is subjected to pulverization treatment. The chemical or physical treatment may be carried out before or after the pulverization treatment.

Examples of physical or chemical treatments of the carbon fibrils include oxidation with nitric acid, oxidation with ozone, organic plasma treatment, coating with resins such as epoxy resins and treatment with coupling agents such as organic silicon and titanium compounds.

The pulverization apparatus may be, for example, a pneumatic grinder (jet mill) or an impact grinder. Because these grinders can be operated continuously and the quantity treated per unit time is greater than that with a ball mill or a vibrating mill, pulverization costs can be lowered. In addition, a uniform carbon fibril aggregate of a narrow particle size distribution can be obtained by installing a classifying mechanism in the grinder or by installing a classifier such as a cyclone in the line.

Determination of the particle diameter of the aggregate was performed as follows. The carbon fibril material was introduced into an aqueous solution of a surfactant and was treated with an ultrasonic homogenizer to form an aqueous dispersion. Determination was made using a laser diffraction scattering type particle size distribution meter with this aqueous dispersion as the test material. The carbon fibril material was mixed with binder powder and the mixture was kneaded, after which it was molded to form a sheet. This sheet was used as the negative electrode. There are no particular limitations on the composition of the binder, and polyethylene or polytetrafluoroethylene can be used.

There are no particular limitations on the composition of the positive electrode. For example, an oxide or sulfide of vanadium, manganese, molybdenum, niobium, titanium or chromium can be used as the active substance, graphite can be used as the conductive material and polytetrafluoroethylene can be used as the binder. These materials can be kneaded to form a sheet, after which lithium can be carried on it as a result of formation.

Further, formation of extended surface area electrodes via electropolymerization and subsequent pyrolysis to yield a disordered carbon, but with higher surface area is possible. The extended surface here may be in the form of flat polymeric ribbons. Certainly, it is the first description of an extended surface disordered carbon based on fibrils. The use of Geus fibrils is available as a composition of the positive electrode.

There are no particular limitations on the composition of the electrolytic solution. For example, it can be prepared by using lithium perchlorate, lithium thiocyanate or lithium borofluoride as the support electrolyte, with propane carbonate, dimethoxyethane and tetrahydrofuran being used individually or in mixtures as the solvent.

There are no particular limitations on the separator. For example, polypropylene nonwoven fabric can be used.

The invention will be more fully described and understood with reference to the following examples which are given by way of illustration.

EXAMPLE 1

A carbon fibril material comprising a carbon fibril diameter of 13 nm and having an average particle diameter of the aggregate of 3.5 $\mu$m, and of which the 90% diameter was 8.2 $\mu$m with a polyethylene binder were mixed at a weight ratio of carbon fibril material and polyethylene binder of 80:20. The mixture was kneaded, and then molded into a sheet to make the negative electrode.

$Cr_3O_8$, acetylene black and tetrafluoroethylene were mixed at a weight ratio of $Cr_3O_8$, acetylene black and tetrafluoroethylene of 40:40:20 and the mixture was kneaded, after which it was molded into a sheet to make the positive electrode.

A 1M propylene carbonate solution of lithium perchlorate was prepared as the electrolyte. A propylene nonwoven fabric impregnated with this electrolyte was inserted between the positive electrode sheet and the negative electrode sheet which were then housed in a case, making a battery of the structure shown in FIG. 1.

The charge-discharge cycle characteristics of the battery that was obtained were evaluated on the basis of the degree of deterioration, C/Co (%), from the initial capacity value, Co (mAh), when charging for 6 hours at a constant voltage of 3 V and continuous discharge for 6 hours at a constant resistance of 10 k$\Omega$ were repeated at room temperature (25° C.).

Self-discharging characteristics were evaluated by studying the degree of deterioration, C/Co (%), from the initial capacity values, Co (mAh), when a battery charged at room temperature (25° C.) was stored at room temperature (25° C.).

The results of the charge-discharge cycle characteristics of the battery versus C/Co (%), and self-discharging characteristics versus C/Co (%) are tabulated in Table 1 below.

TABLE 1

| Charge-discharge cycle characteristics (cycles) | C/CO (%) |
| --- | --- |
| 100 | 98 |
| 200 | 95 |
| 500 | 92 |
| 1000 | 90 |

| Self-discharging characteristics (days) | C/CO (%) |
| --- | --- |
| 10 | 98 |
| 50 | 95 |
| 100 | 90 |

The lithium battery of this invention had a long charge-discharge cycle life and also had superior self-discharging characteristics.

The carbon fibril material that is used in this invention is an aggregate of fine, filiform carbon fibrils, for which reason there is smooth infiltration of electrolytic solution when it is used as the negative electrode in lithium batteries. Moreover, because it has a large effective surface area, the lithium ion insertion reaction is effected uniformly and rapidly throughout the entire negative electrode. For this reason, reactions between the negative electrode and the solvent and formation of dendrites are controlled to a greater extent than with conventional carbon fibril materials and charge-discharge cycle life and self-discharging characteristics are improved.

EXAMPLE 2

Example 1 was repeated using Geus (fishbone) fibrils. Similar results were obtained.

Having thus described in detail preferred embodiments of the present invention, it is to be understood that the invention defined by the appended claims is not limited to particular details set forth in this description as many variations thereof are possible without departing from the spirit or scope of the present invention.

What is claimed is:

1. A lithium battery, comprising an anode, cathode and electrolyte, wherein the anode comprises lithium-intercalated carbon fibrils; the fibrils formed as hollow tubes with wall thicknesses of 2 to 5 nanometers and outer diameters between 3.5 and 75 nanometers, and the fibrils present in the anode as aggregated or non-aggregated masses, with the masses having average particle diameters of 0.1 to 100 $\mu$m.

2. A lithium battery characterized in that the anode is formed using a carbon Geus (fishbone) fibril material comprised of Geus (fishbone) fibrils having an average particle diameter of 0.1 to 100 $\mu$m in which carbon Geus (fishbone) fibrils of 3.5 to 75 nm in diameter are present, said Geus (fishbone) fibrils being intercalated with atomic lithium.

3. A lithium battery, comprising an anode, cathode and electrolyte, wherein the cathode comprises carbon fibrils and the anode comprises lithium-intercalated carbon fibrils; the carbon fibrils and the lithium-intercalated carbon fibrils formed as hollow tubes with wall thicknesses of 2 to 5 nanometers and outer diameters between 3.5 and 75 nanometers, and present as aggregated or non-aggregated masses, the masses having average particle diameters of 0.1 to 100 $\mu$m.

4. A lithium battery including a carbon fibril-containing cathode and an anode containing Geus (fishbone) fibrils having an average particle diameter of 0.1 to 100 $\mu$m in which carbon Geus (fishbone) fibrils of 3.5 to 75 nm in diameter are present, said Geus (fishbone) fibrils being intercalated with atomic lithium.

* * * * *